(12) United States Patent
Hojsgaard (10) Patent No.: US 6,325,935 B1
(45) Date of Patent: Dec. 4, 2001

(54) SYSTEM AND METHOD FOR REDUCING THE PATHOGEN CONCENTRATION OF SLUDGE

(75) Inventor: Soren J. Hojsgaard, Hillerod (DK)

(73) Assignee: Kruger A/S, Soborg (DK)

( * ) Notice: Subject to any disclaimer, the term of this patent is extended or adjusted under 35 U.S.C. 154(b) by 0 days.

(21) Appl. No.: 09/364,994

(22) Filed: Aug. 2, 1999

(51) Int. Cl.⁷ .............................. C02F 11/02; C02F 11/18
(52) U.S. Cl. .................... 210/609; 210/613; 210/742; 210/175; 165/299
(58) Field of Search ...................... 210/609, 613, 210/742, 764, 766, 175, 259; 165/299, 300

(56) References Cited

U.S. PATENT DOCUMENTS

| | | | |
|---|---|---|---|
| 3,296,122 | * 1/1967 | Karassik et al. | 210/175 |
| 3,655,046 | * 4/1972 | Trussell | 210/613 |
| 3,697,417 | * 10/1972 | Teletzke et al. | 210/609 |
| 3,876,536 | * 4/1975 | Pradt et al. | 210/609 |
| 4,276,174 | * 6/1981 | Breidev et al. | 210/613 |
| 5,067,231 | * 11/1991 | Mueller et al. | 210/742 |
| 5,618,442 | * 4/1997 | Christy | 210/742 |
| 6,047,768 | * 4/2000 | Buehler, III | 210/609 |
| 6,117,203 | * 9/2000 | Buchave et al. | 210/609 |

* cited by examiner

Primary Examiner—Christopher Upton
(74) Attorney, Agent, or Firm—Coats & Bennett, P.L.L.C.

(57) ABSTRACT

A waste treatment system comprises a first heat exchanger positioned before one or more reactors. The reactors discharge treated sludge to a second heat exchanger. The first and second heat exchangers share a heat transfer medium wherein the heat from the treated sludge is transferred to the incoming sludge. The treated sludge is cooled to reach an optimal temperature range before entry into a digester. The system also is adapted to allow a pipe cleaning device or "pig" to clean the heat exchangers by being forced through the heat exchangers by pressurized and pasteurized wastewater.

23 Claims, 6 Drawing Sheets

SYSTEM AND METHOD FOR REDUCING THE PATHOGEN CONCENTRATION OF SLUDGE

FIELD OF THE INVENTION

The present invention relates to sludge treating systems and more particularly to a predigestion pathogen reduction system.

BACKGROUND OF THE INVENTION

It is common practice to treat sludge for pathogens by heating the sludge and holding the heated sludge in one or more reactors for a certain time period. Typically incoming sludge is heated to approximately 70° C. and held in one or more reactors for approximately one hour. After being held in the reactor or reactors, the sludge is cooled and directed into a digester where the sludge is held for a selected time period. Further, in treating sludge for pathogens, it is known to heat the incoming sludge and cool the treated sludge by a network of heat exchangers. Essentially the heat exchangers remove heat from the treated sludge and add heat to the incoming sludge.

Cooling the treated sludge to a selected temperature is quite important. This is because the treated sludge is directed to a digester that is held at a certain temperature and if the treated sludge is of a temperature that substantially departs from the design temperature of the digester, then this can substantially and adversely affect the digestion process. Usually, in the case of a mesophillic digester, the sludge held therein is maintained at a temperature of approximately 35° C. To avoid adversely impacting the sludge held in the digester, it is common practice to attempt to cool the treated sludge leaving the reactors to a target temperature range of approximately 34°–38° C.

In most pathogen reduction systems, it is virtually impossible to precisely control the temperature of the treated sludge being directed to the digester. In some cases, the heat exchanger network utilized relies on sludge-to-sludge heat exchangers, that is, the treated sludge leaving the reactor or reactors is circulated through a heat exchanger through which the incoming sludge passes. Thus the degree of heat transfer that takes place is dependent in large part on the flow rates of the incoming sludge and the treated sludge. Suffice it to say that there is very little practical opportunity to precisely control the temperature of the treated sludge, especially in cold climates. As a result, many pathogen reduction systems produce a treated sludge that, although subject to passing through one or more heat exchangers, fails to meet the target temperature range prior to introduction into a digester. Indeed, the problem is significant because of the lack of control of the sludge and/or heat transfer medium passing through the heat exchangers and the fact that the systems are designed for constant flow rates for all seasons of the year. Thus while it may be easy to meet the targeted temperature range in summer months for a given system, it may be quite difficult to meet the targeted temperature range using that same system during winter months.

Furthermore, in sludge treatment systems the heat exchangers tend to accumulate a build up of material such as grease foulings and other deposits within their inner walls as a result of the continuous passing of sludge through the heat exchangers. Eventually the heat exchangers must be cleaned. Typically this requires that the sludge treatment process be halted in order that the individual heat exchangers can be cleaned. The cleaning process for heat exchangers is time consuming and laborious. Not only is it costly in terms of labor to clean heat exchangers, but the fact that the sludge treatment process has to be shut down results in an even greater cost.

SUMMARY OF THE INVENTION

The present invention entails a system and method for reducing pathogens in sludge prior to the sludge reaching a digester. The method entails directing incoming sludge through a first heat exchanger which heats the sludge prior to the sludge being directed into one or more reactors where the sludge is held at an elevated temperature for a selected time period. After the selected time period has elapsed, the treated sludge is then directed from the reactor or reactors to and through a second heat exchanger (which may include a number of sections) that effectively cools the sludge before the sludge is introduced into a digester. In one embodiment of the present invention, there is provided a closed loop conduit that channels a heat transfer medium through the first and second heat exchangers. The heat transfer medium effectively removes heat from the treated sludge and adds heat to the incoming sludge. In order to more precisely control the temperature of the treated sludge, a variable speed pump is associated with the closed loop heat transfer medium for pumping the heat transfer medium through the first and second heat exchangers. By controlling and varying the flow rate of the heat transfer medium, it is appreciated that the temperature of the treated sludge exiting the second heat exchanger and directed to the digester can be more precisely controlled to meet a target temperature range.

Further, additional temperature control can be realized by employing other heat exchangers within the pathogen reduction system. For example, the treated sludge may be directed through another cooling heat exchanger where the cooling medium is treated wastewater. In order to vary the heat transfer in this case, a variable speed pump can be utilized to pump the treated wastewater through the cooling heat exchanger so as to remove heat from the treated sludge. A programmable controller may be operatively connected to the variable speed pump for varying the flow rate of the treated wastewater through the heat exchanger so as to control the temperature of the treated sludge prior to it entering into the digester. In one embodiment of the present invention, a single programmable controller can be utilized to control a series of heat exchangers so as to optimize the amount of heat transferred to the incoming sludge while at the same time adjusting the temperature of the treated sludge such that it meets the temperature target range established for the treated sludge before it enters the digester.

Another aspect of the present invention entails a method and system for cleaning the heat exchangers. In this regard, a fluid such as treated wastewater is pasteurized and held within a supply tank. A pump is utilized to pump this pasteurized fluid to a point where it contacts a pipe cleaning device and then the pressurized fluid is used to drive or move the pipe cleaning device through one or more heat exchangers associated with the pathogen reduction system. As the pipe-cleaning device is driven through the heat exchanger, it along with the pressurized fluid cleans deposits such as grease foulings from the interior of the heat exchanger.

Other objects and advantages of the present invention will become apparent and obvious from a study of the following description and the accompanying drawings, which are merely illustrative of such invention.

DETAILED DESCRIPTION OF THE INVENTION

Figure 1:
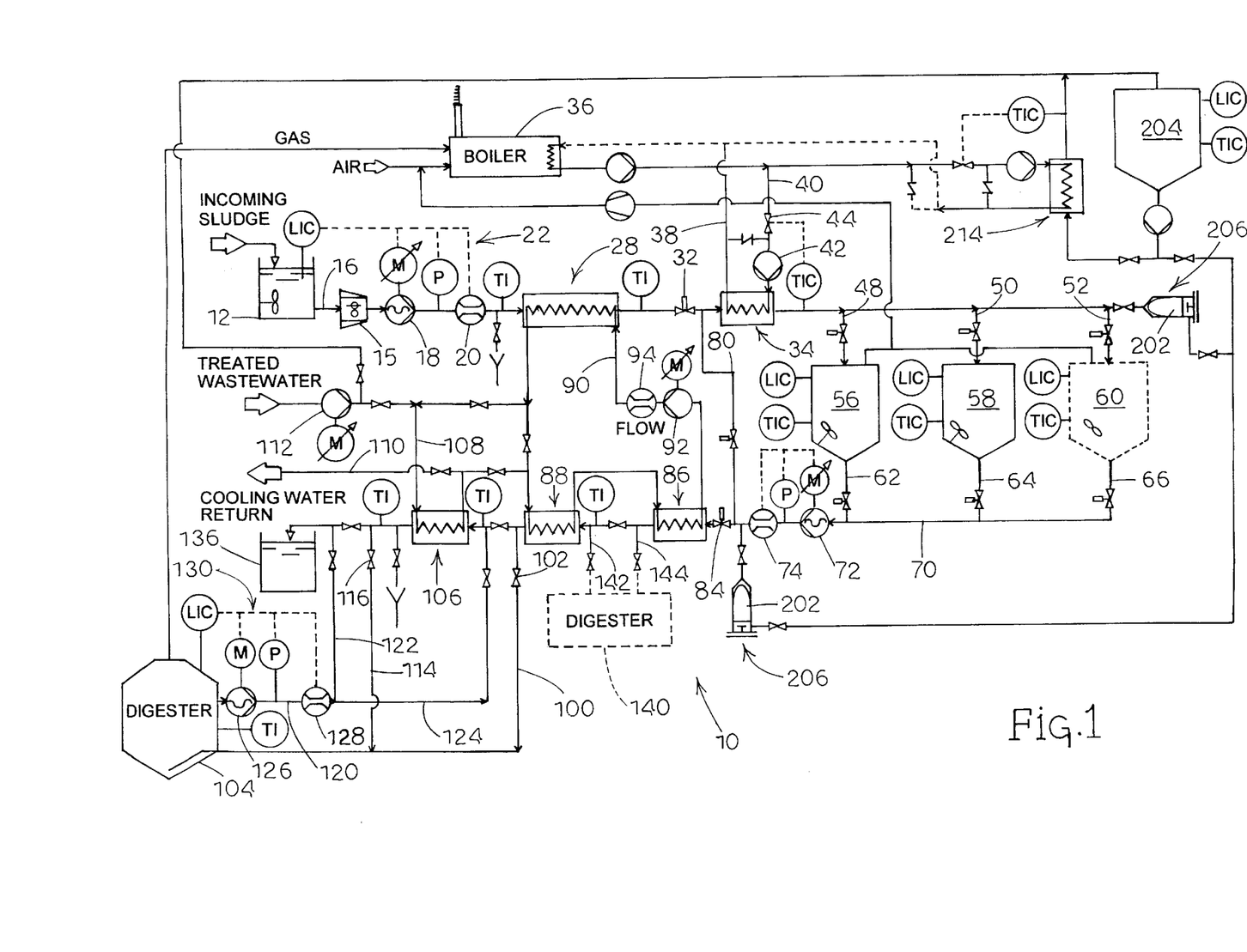
FIG. 1 is a schematic illustration of the predigestion pathogen reduction system of the present invention.

Turning now to the drawings, FIG. 1 shows a pathogen reduction system 10, which is designed to treat sludge and to remove or reduce pathogens, such as bacteria, viruses, etc., from the sludge. Generally, the sludge being treated by the pathogen reduction system 10 constitutes either primary or secondary sludge or both. Those skilled in the art will appreciate that primary sludge is typically separated from influent wastewater during the course of primary treatment. Secondary sludge, on the other hand, is separated from the wastewater during the course of secondary treatment.

In conventional sludge treatment, both the primary and secondary sludge is combined, and after being combined, is directed to a digester such as anaerobic or aerobic digester. Once in the digester, the sludge is held for an extended time, sometimes on the order of approximately 30 days, and at a selected temperature level, which is typically about 34°–38° C. During the process, the digester performs two important functions. First, the digester reduces the number of pathogens such as bacteria, viruses, etc. Secondly, the digester removes or at least substantially reduces, volatile solids found in the sludge.

In the sludge treatment process of the present invention, pathogen reduction is separated from the treatment for volatile solids. In fact, pathogen reduction occurs outside of the digester. In the preferred process illustrated and discussed herein, the pathogen reduction system 10 reduces the pathogens in the sludge prior to the sludge being admitted to the digester 104. But after the pathogens have been reduced in the sludge, the sludge is then directed to a digester 104 which treats the sludge over a period of approximately 20–22 days so as to remove volatile solids from the sludge.

Turning to the pathogen reduction system of the present invention and with reference to FIG. 1, it is appreciated that sludge is directed into and held within a sludge holding tank 12. The sludge directed into the holding tank 12 may be primary sludge or a biological sludge, which is sometimes refereed to as waste activated sludge, or a combination of both. Extending from the sludge holding tank 12 is an incoming sludge line 16. Disposed in the incoming sludge line 16 just down from the holding tank 12 is a sludge macerator 15 that chops and grinds the incoming sludge into a fine consistency. Sludge from the macerator 15 is directed to a variable speed pump 18 and disposed downstream of the pump is a flow meter 20. A control loop indicated generally by the numeral 22 basically controls and varies the flow of sludge from the holding tank 12 through the incoming sludge line 16. As a part of the control loop, there is provided a level indicator LIC that senses the level of sludge in the holding tank 12. Further, a pressure sensor P is connected in the incoming sludge line 16 between the variable speed pump 18 and the flow meter 20. The control loop 22 is tied to the level indicator LIC, pressure sensor P, flow meter 20 and the variable speed pump 18. Accordingly, the speed of the variable speed pump 18 is controlled and adjusted, in part at least, in accordance with the level of sludge in the holding tank 12.

Disposed downstream of the flow meter 20 is a first heat exchanger indicated generally by the numeral 28. The first heat exchanger is comprised of the incoming sludge line 16 and a closed loop conduit 90 that channels a heat transfer medium such as water through the first heat exchanger in a heat exchange relationship with the incoming sludge. As will be appreciated from subsequent portions of this disclosure, the heat utilized for this purpose is transferred to the heat transfer medium from the treated sludge in a heat exchanger relationship within heat exchangers 86 and 88.

Disposed on opposite sides of the first heat exchanger is a pair of temperature indicators TI. The temperature indicators function to sense the temperature of the incoming sludge on opposite sides of the first heat exchanger 28.

The incoming sludge line 16 leading from the first heat exchanger 28 is directed through a control valve 32 into another heat exchanger, indicated generally by the numeral 34 sometimes referred to as a heating heat exchanger. Heat exchanger 34 is operatively connected to a boiler 36. Hot water from the boiler is directed through lines 38 and 40 via a pump 42 into and through the heat exchanger 34. Operatively associated with the heating heat exchanger 34 is a temperature controller TIC that is coupled to a control valve 44 disposed in line 40. Temperature controller TIC senses the temperature of the incoming sludge on the outlet side of the heat exchanger 34 and in response to the sensed temperature controls the flow rate of hot water from the boiler 36 to the heat exchanger 34. In the case of a preferred design, the temperature of sludge exiting the heat exchanger 34 should be approximately 70° C. Consequently if the temperature falls below or above that targeted temperature, the controller TIC acts to increase or decrease the flow rate of hot water to the heat exchanger 34 so as to meet that target temperature.

From the heating heat exchanger 34, the incoming sludge line 16 leads to a series of reactor inlet lines 48, 50 and 52. Each of these inlet lines includes a control valve. Further the inlet lines 48, 50 and 52 lead to a series of three reactors 56, 58 and 60. Incoming sludge, after it has been heated to the target temperature, is directed into each of these reactors. During the course of treatment, one of the reactors will be filling, while another one of the reactors will be discharging, and while the third reactor will simply be in a holding state. The reactors accumulatively act to hold the heated incoming sludge for a selected time period, for example one-hour, and to hold the sludge at an elevated temperature so as to reduce the pathogen concentrations within the sludge. For a more complete understanding of the function and role of the reactors 56, 58 and 60, one is referred to the disclosure found in U.S. patent application Ser. No. 08/966,728, filed Nov. 10, 1997, now U.S. Pat. No. 6,117,203, and entitled Pathogen Reduction System Used in Treating Wastewater, the disclosure of which is expressly incorporated herein by reference.

The reactors are connected to a series of outlet lines 62, 64 and 66. Each outlet line includes a control valve. As seen in FIG. 1, the sludge leaving the reactors, referred to as treated sludge, is directed through the respective outlet lines into a treated sludge line 70. Once the treated sludge is directed into the treated sludge line 70, the treated sludge is directed through a variable speed pump 72 and a flow meter 74. A control loop is provided for controlling the flow of treated sludge through line 70. In particular, the control loop is connected to the variable speed pump 72 and flow meter 74. The flow rate of sludge through line 70 is controlled such that the flow rates of the sludge in the incoming line 16 and the treated sludge line 70 are generally equal. Thus from a control point of view, the variable speed pumps 72 and 18 are linked such that together the sludge flow rates in lines 16 and 70 are generally equal. However, the control loop would control the flow in each of these lines in accordance with the level indicator LIC associated with the holding tank 12.

Downstream from the flow meter 74 there is provided a cross line 80 that extends between the treated sludge line 70 and the incoming sludge line 16. A control valve is positioned in that line. This permits the operator in certain selected cases to return a batch volume of inadequately treated sludge back to the hot water heat exchanger 34. This permits previously treated sludge to be retreated in the reactors 56, 58 and 60.

Figure 6:
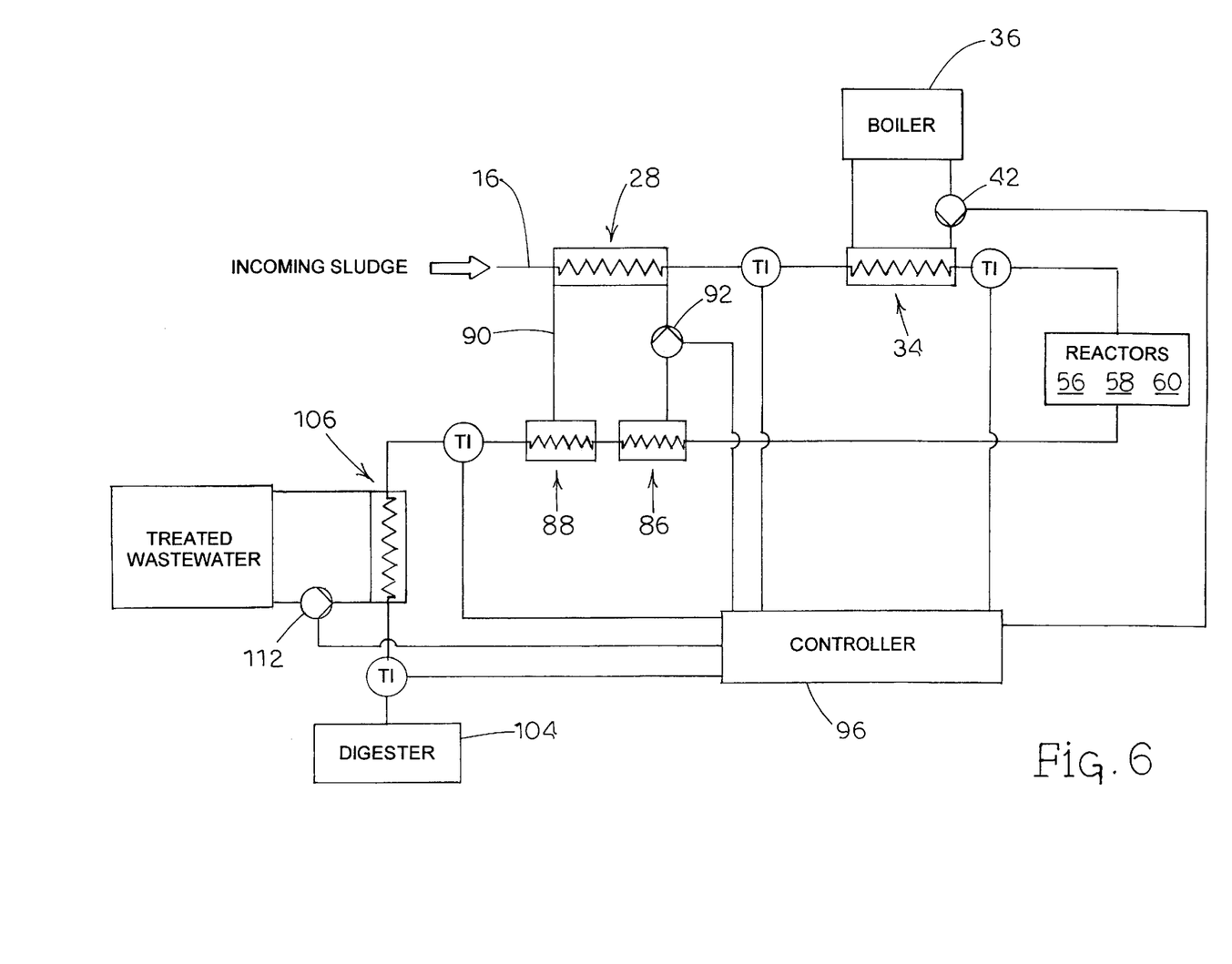
FIG. 6 is a schematic illustration of the heat exchangers and the controller for controlling the flow of heat transfer mediums through the respective heat exchangers.

The treated sludge line 70 extends from the flow meter 74 to a control valve 84. Treated sludge passing through the control valve 84 is then routed through a second heat exchanger that in the case of the present embodiment includes two heat exchanger sections 86 and 88. It will be appreciated that the second heat exchanger could simply be comprised of a single heat exchanger or multi-sections. In any event, there is provided a closed loop conduit 90 that extends through the first heat exchanger 28 and through the heat exchangers sections 86 and 88. As will be discussed subsequently herein, the closed loop conduit extends around the incoming sludge line 16 within the first heat exchanger 28 and around the treated sludge line 70 passing through the heat exchanger sections 86 and 88. Forming a part of the closed loop conduit 90 is a variable speed pump 92 and a flow meter 94. Contained within the closed loop conduit 90 is a heat exchange medium such as water. The variable speed pump 92 pumps the heat exchange medium through the closed loop conduit 90 in a direction that is counter to both the flow of incoming sludge within line 16 and the flow of treated sludge in line 70. To control the rate of heat transfer taking place within heat exchangers 28, 86 and 88, the variable speed pump 92 is coupled to a controller 96. Controller 96, as illustrated in FIG. 6, effectively controls the speed of the variable speed pump 92 so as to optimize the heat transfer to the incoming sludge and yet maintain the temperature of the treated sludge at or within a target temperature range before it is introduced into the digester 104, or at least reduce the temperature of the treated sludge to some degree so that further cooling is minimal. Subsequent portions of this disclosure will discuss this control feature in more detail.

Disposed on opposite sides of the heat exchanger sections 86 and 88 is a pair of temperature indicators TI. Branching from the treated sludge line 70 downstream of the heat exchanger section 88 is a secondary sludge outline 100. A control valve 102 is disposed in the outlet line 100 and as seen in FIG. 1 the outlet line 100 leads to the digester 104.

Disposed about the sludge treatment line 70 downstream of the second heat exchanger (heat exchange sections 86 and 88) is a cooling heat exchanger indicated generally by the numeral 106. If the cooling requirement of the treated sludge cannot be met by heat exchanger sections 86 and 88, then the cooling heat exchanger 106 further acts to cool the treated sludge. This heat exchanger further acts to cool the treated sludge. In this case, lines 108 and 110 connect to the cooling heat exchanger 106 and one of those lines is connected to a source of water or treated wastewater. A pump 112 is communicatively connected to line 108 and functions to pump treated wastewater into and through the cooling heat exchanger 106. Consequently, treated wastewater is directed through the cooling heat exchanger in a heat exchange relationship with the treated sludge so as to further cool the treated sludge. A pair of temperature indicators TI are disposed on opposite sides of the cooling heat exchanger 106.

Downstream from the cooling heat exchanger 106 there is provided a primary sludge outlet line 114, that includes a control valve 116, that branches off from the treated sludge line 70. Line 114 joins line 100 and consequently functions to direct sludge from the cooling heat exchanger 106 to the digester 104.

Digester 104 is designed to perform a mesophilic digestion process and as such, the treated sludge will remain in the digester approximately 20–22 days and during this time period the sludge held therein will be maintained at a temperature of approximately 35° C.

Digested sludge is directed from the digester 104 through a digester outlet line 120 that branches into lines 122 and 124. To transfer the digested sludge to a holding tank 136 there is provided a variable speed pump 126 that directs the sludge from the digester 104 through line 120 and through a flow meter 128. To control the speed of the variable speed pump 126 and the flow rate of sludge through line 120, there is provided another control loop 130. This control loop basically ties the variable speed pump 126 with a level indicator LIC, a pressure gauge or sensor P and the flow meter 128. Thus the flow rate of sludge through line 120 to the holding tank 136 is a function of the level of sludge within the digester 104 and the pressure and flow rate sensed by the pressure gauge 134 and the flow meter 128.

As noted above, in the embodiment illustrated herein, the digester 104 is designed to perform a mesophilic digestion processes. However, the pathogen reduction system 10 of the present invention is provided with the capability of optionally directing the treated sludge to a thermophilic digester 140. As illustrated in FIG. 1, there is provided a pair of lines 142 and 144 that extend from the sludge treatment line 70, between heat exchanger sections 86 and 88, to the thermophilic digester 140. Here the temperature of the treated sludge would be maintained at approximately 55° C. for a period of approximately 10–12 days. Because of the higher temperature, it is appreciated that the treated sludge does not have to be cool to the degree required when operating the mesophilic digester 104.

In a preferred embodiment, the respective heat exchangers 28, 34, 86, 88, and 106 are designed such that the flow of sludge is always counter to the flow of the heat transfer medium or other fluid that is flowing in heat exchange relationship with the sludge. For example, as illustrated in FIG. 1, sludge flows from left to right through the heat exchanger 28 while the heat transfer medium flowing in line 90 flows right to left through the same heat exchanger. Generally, the sludge line passing through the respective heat exchangers is disposed in a serpentine configuration in that it zigzags back and forth through the heat exchanger.

Figure 3:
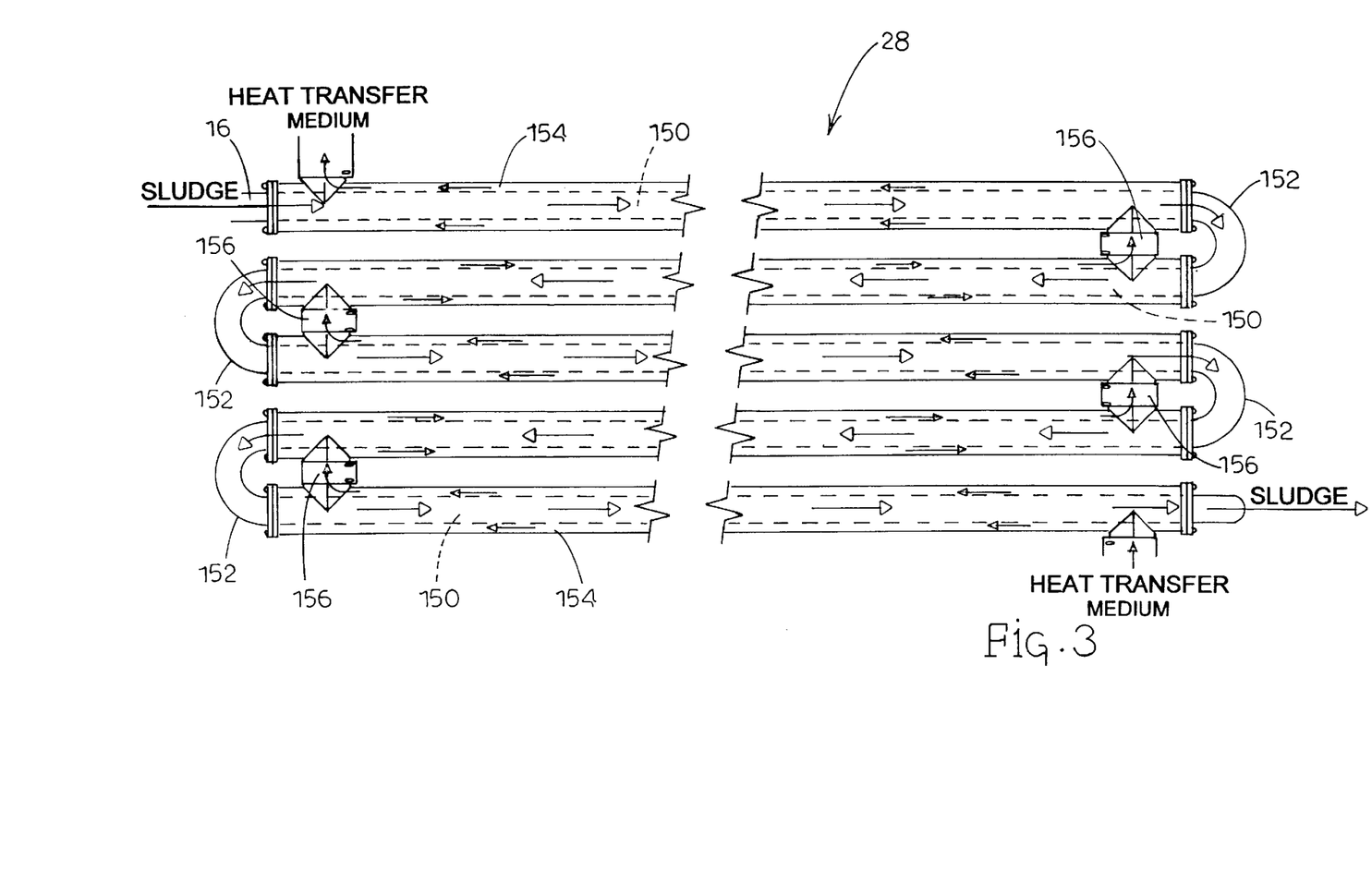
FIG. 3 is a cross sectional view illustrating a portion of the heat exchange network used in the pathogen reduction system.

FIG. 3 illustrates a portion of heat exchanger 28. Note that the sludge line 16 enters the inlet side of the heat exchanger 28 and joins with a sludge segment 150. The sludge segment extends a selected length and connects with an elbow 152 that connects with a succeeding sludge segment 150. Thus, the heat exchanger 28 includes a series of stacked sludge segments 150 that are joined together by a series of elbows 152. Thus, it is appreciated that the incoming sludge is channeled back and forth through the respected sludge segments 150.

Disposed around each sludge segment 150 is an outer conduit 154. The outer conduit 154 is designed to receive and channel the heat transfer medium being pumped through line 90. In order to direct the heat transfer medium from one outer conduit to another outer conduit, about the end portions of respective pairs of outer conduits there is provided a connector 156. The connector 156 allows the heat transfer medium to move from one outer conduit to another. Thus as illustrated in FIG. 3, the heat transfer medium, which would comprise water or other efficient heat transfer fluids, completely surrounds the sludge passing within the sludge segments 150.

Details of the other heat exchangers are not shown herein but they also would assume the same type of configuration illustrated in FIG. 3. In fact, for efficiency, heat exchanger 28 along with heat exchanger sections 86 and 88 may be consolidated in a single bank such that the respective heat exchangers would lie in close side-by-side relationship.

Figure 2:
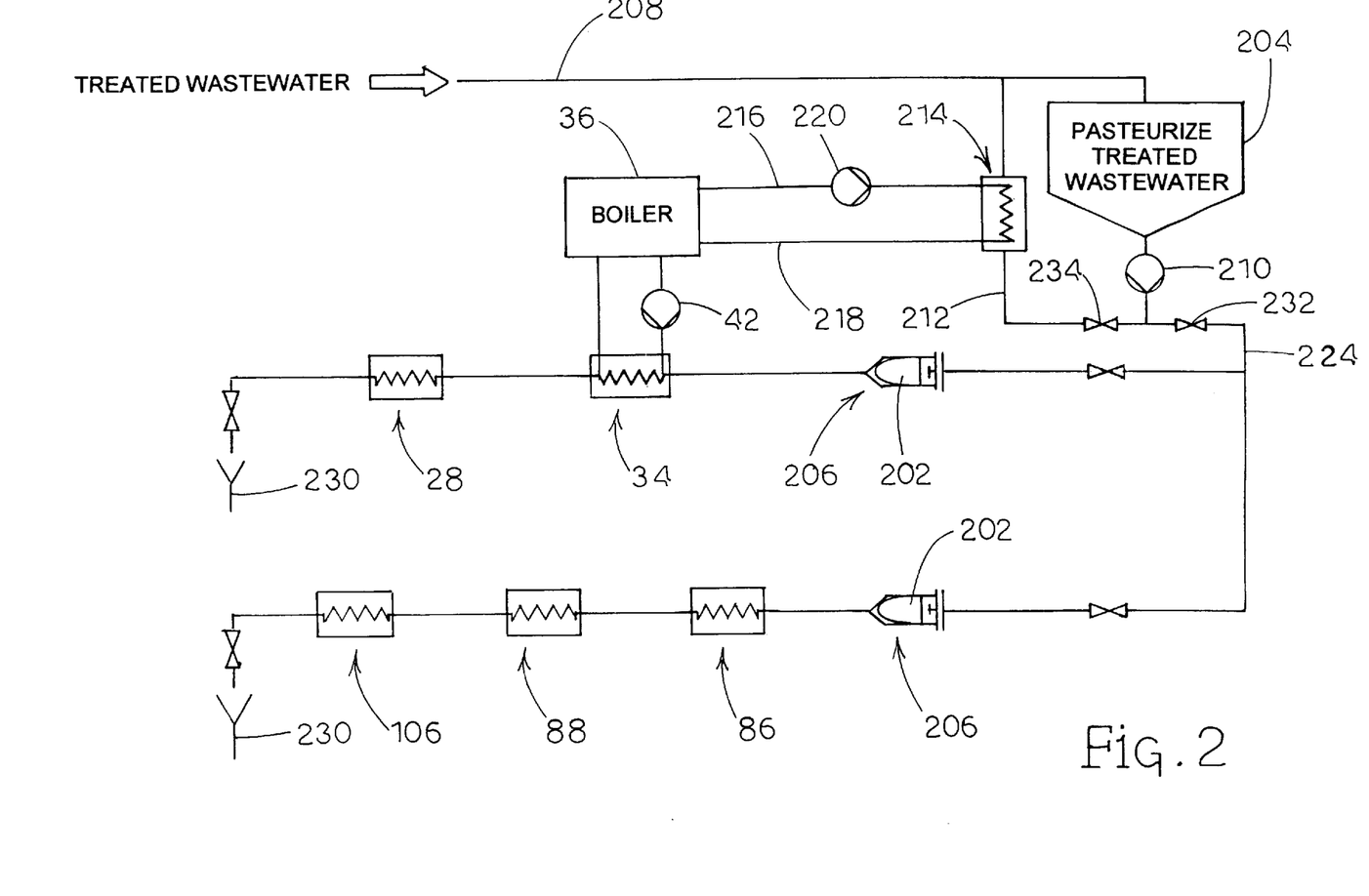
FIG. 2 is a schematic illustration depicting a portion of the automatic heat exchanger cleaning system.

As the sludge moves through the respective heat exchangers on a continuing basis, the internal lines or pipes that carry the sludge tend to accumulate deposits such as grease foulings and the like. In order to clean the respective heat exchangers such that the pathogen reduction system of the present invention will operate efficiently, it is necessary to shut down the sludge treating process. The present invention entails an automatic cleaning system for the heat exchangers and this system is indicated generally by the numeral 200. While the automatic sludge cleaning system is shown in FIG. 1, FIG. 2 is a schematic illustration of the same system shown separated from the pathogen reduction system detailed in FIG. 1. To facilitate an appreciation for the automatic heat exchanger cleaning system 200, reference will be made to FIG. 2

Basically, the automatic heat exchanger cleaning system 200 of the present invention entails utilizing a pipe cleaning device, sometime referred to as a pig 202 and actually driving the pig 202 through the respective heat exchangers by utilizing pressurized and pasteurized treated wastewater. With particular reference to FIG. 2, incoming treated wastewater is directed though line 208 into a holding tank 204. Disposed on the outlet side of the holding tank 204 is a pump 210 that leads to both a recirculating line 212 and a delivery line 224. By selectively opening and closing valves disposed in both the recirculating line 212 and the delivery line 224, the treated wastewater held within the holding tank 204 can be selectively directed to either line. In one mode of operation, valve 232 in delivery line 224 is closed while control valve 234 is open. This enables pump 210 to circulate the wastewater in holding tank 204 through a heat exchanger 214. The treated wastewater is heated by a hot water boiler 36. Hot water is pumped by pump 220 through lines 216 and 218 back and forth between the boiler 36 and the heat exchanger 214. In order to pasteurize the treated wastewater within holding tank 204, it is contemplated that the wastewater would be heated to approximately 70° C. As suggested by FIG. 1, there is a temperature controller TIC associated with the holding tank 204 and that in conjunction with a control loop is operative to vary the flow rate of hot water from the boiler 36 through the heat exchanger 214 so as to maintain the temperature within the holding tank 204 at a temperature that is sufficient to ensure that the wastewater is pasteurized.

In the embodiment illustrated herein, the delivery line 224 leads to a pair of pig pickup stations indicated generally by the numeral 206. Essentially, the pig pickup stations 206 act to receive a pig and to hold the same therein until a system of pressurized water is directed to the respective pig pick up stations 206. Once the treated wastewater is pumped into delivery line 224, the pressurized water enters the respective pig pickup stations 206 and causes the pig 202 contained therein to be directed from the pig pickup stations 206 through various heat exchangers in the system. In the embodiment illustrated in FIG. 2, the delivery line 224 leads to both the incoming sludge line 16 and the treated line 70. As illustrated in FIG. 2, once the pasteurized treated wastewater reaches the upper pickup station 206, that is the pickup station that communicates with line 16, the pig 202 within the pickup station is forced through the incoming sludge line 16. Because the pig 202 is a compressible cleaning device, the pressurized wastewater causes the pig to compress as it leaves the pickup station 206 and enters the incoming sludge line 16. Thus it is seen that the pig 202 travels through the sludge line found in heat exchanger 34 as well as the sludge line or sludge segments 150 found in heat exchanger 28. Thus the pressurized wastewater causes the pig to move through the various serpentine segments of each heat exchanger and to clean the same in the process. By selectively controlling various valves in the system, the pig 202 is directed from the system to where it is caught by a combination drain and grate 230. Likewise, in FIG. 2, along the lower branch illustrated, the pig 202 is forced to compress and move through the heat exchanger sections 86 and 88 as well as the final cooling heat exchanger 106. Again, the pig 202 exits the system and is caught by a combination drain and grate 230.

Figure 4:
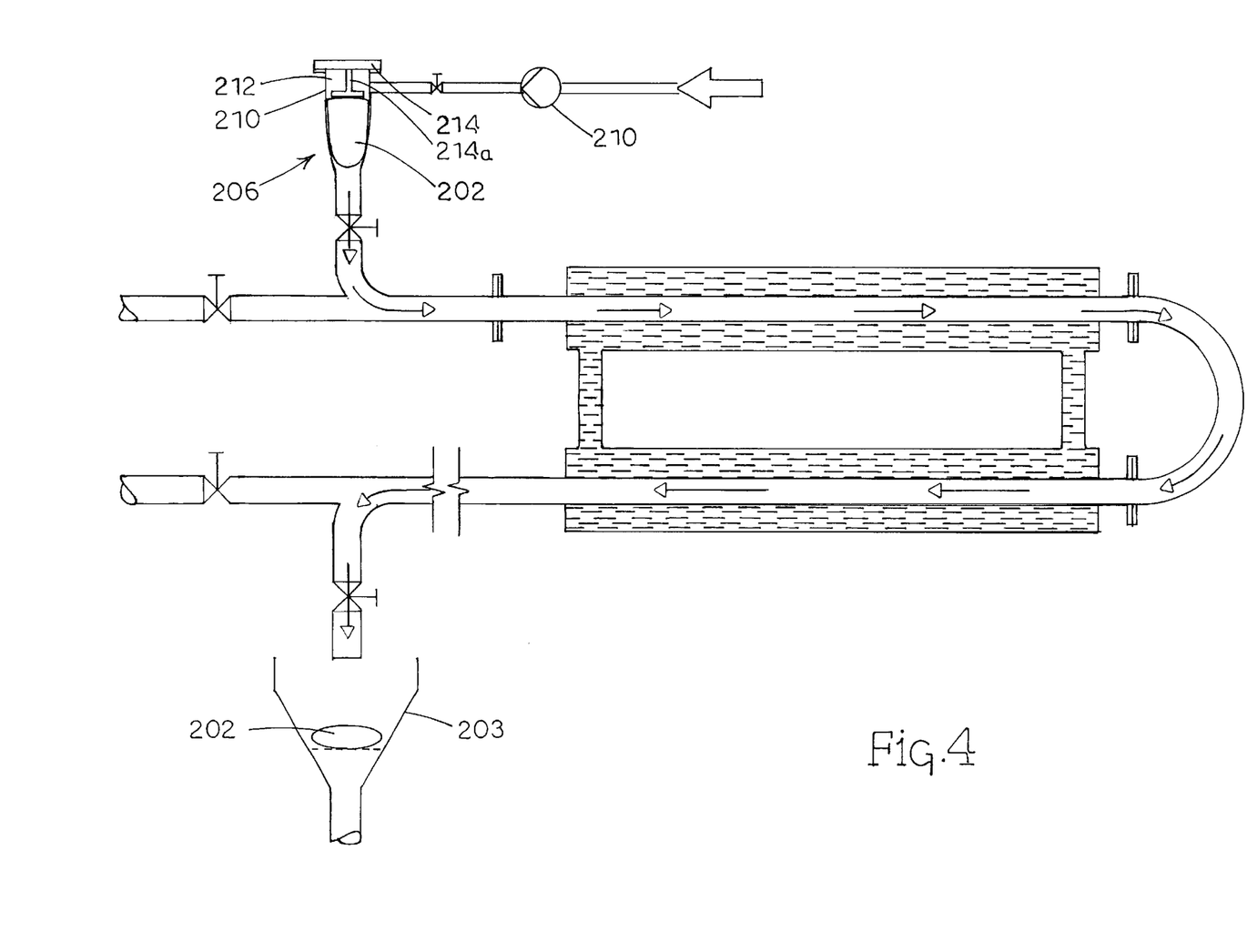
FIG. 4 is a schematic illustration showing the mechanism utilized for automatically cleaning the heat exchangers.

FIG. 4 is another schematic illustration that shows the automatic heat exchanger cleaning system of the present invention. Note that the treated wastewater is pumped by pump 210 into the side of the pig pickup station 206. The pig pickup station 206 includes a receptor 210 that includes an inlet opening 212. Receptor 210 in this embodiment is generally tapered inwardly from the inlet 212. The inlet 212 is normally closed by a closure plate 214. Closure plate 214 can be secured to the inlet through a flange and bolt assembly construction. Note that the closure plate 214 includes a tee 214a that projects into the receptor 210. The base of the tee functions to engage the pig 202 and to basically confine the pig 202 within the receptor until pressurized wastewater is directed into the receptor 210.

It is appreciated from FIG. 4, that the treated wastewater under pressure enters the side of the receptor 210. Once the treated wastewater under pressure enters the receptor, the pig 202 will be driven through the connecting line and any number of control valves to one or more of the heat exchangers. In FIG. 4, a portion of a heat exchanger is shown schematically. Note that the pig will be driven through the internal pipe or conduit within the heat exchanger, that is the internal pipe or conduit that carries the sludge. As discussed before, the pig 202 can be driven through one or more heat exchangers before the pig 202 exits the cleaning system. As illustrated in FIG. 4, by selectively actuating various control valves, the pig 202 can be directed from the system into a combination drain and grate 230. The cleaning operation is accomplished by the combined effects of the pig 202 and the hot pressurized wastewater. Since the pig 202 is both compressible and aggressive, it itself tends to conform to the shape of the sludge line and as it is driven through the sludge line it will clean and break away grease foulings and other deposits. Once these deposits have been broken away, the pressurized wastewater will clean and rinse the deposits from the sludge line.

As is appreciated from the foregoing disclosures, the series of heat exchangers employed within the pathogen reduction system 10 function to heat the incoming sludge and at the satile time cool the treated sludge to meet a target temperature range for the digester 104. Essentially it is important to heat the incoming sludge to approximately 70° C. before the sludge reaches the reactors 56, 58 and 60. Thus the treated sludge exiting the reactors will have a temperature of approximately 70° C. or slightly less. This treated sludge will eventually be directed into the digester 104. Digester 104 in this design functions as a mesophilic digester and consequently for optimum performance the temperature of the sludge held therein is approximately 35°. Thus it is important from a digestion point of view, to make sure that the treated sludge entering the digester 104 falls within a target temperature range, in this case approximately 34–38° C. Consequently, in most cases it will be required that the treated sludge be cooled in order to meet this target temperature range.

The present invention entails a control system for controlling the temperature of the incoming sludge as well as the treated sludge. Primarily, the system aims to control the temperature of the treated sludge reaching the digester to the target temperature range of 34–38° C. while at the same time transferring as much heat as possible from the treated sludge to the incoming sludge.

The controller, indicated by the numeral 96, is integrated into the pathogen reduction system as schematically shown in FIG. 6. Controller 96 is programmable and is operatively connected to a number of components that make up the pathogen reduction system. As illustrated in FIG. 6, the controller 96 is connected to the variable speed pumps 42, 92, and 112. Thus the controller 96 is operative to control the speeds of these respective pumps independently of each other. In addition, there are a series of temperature indicators TI disposed throughout the system at strategic locations. These temperature indicators TI are also connected to the controller. As noted above, the function of the controller 96 is to receive the temperature data from the respective temperature indicators TI and to control the speed of the various pumps 104 so as to assure that the sludge entering the digester 104 meets the target temperature range while at the same time efficiently transferring heat from the treated sludge to the incoming sludge.

In a majority of the cases, it is contemplated that the temperature of the sludge entering the digester 104 would be greater than the target temperature range assuming the absence of any heat exchangers performing a cooling operation. Therefore, in most cases the treated sludge leaving the reactors 56, 58 and 60 will require cooling. Since it is important to achieve optimum heat transfer to the incoming sludge, it is appropriate to designate, in this particular embodiment, heat exchanger sections 86 and 88 as the priority cooling exchangers. If sufficient cooling cannot be achieved by exchanger sections 86 and 88, then the treated wastewater exchanger 106 can be employed. It should also be appreciated that the controller 96 may very well function to employ both the heat exchanger sections 86 and 88 along with the treated wastewater exchanger 106 to effectuate cooling.

Figure 5:
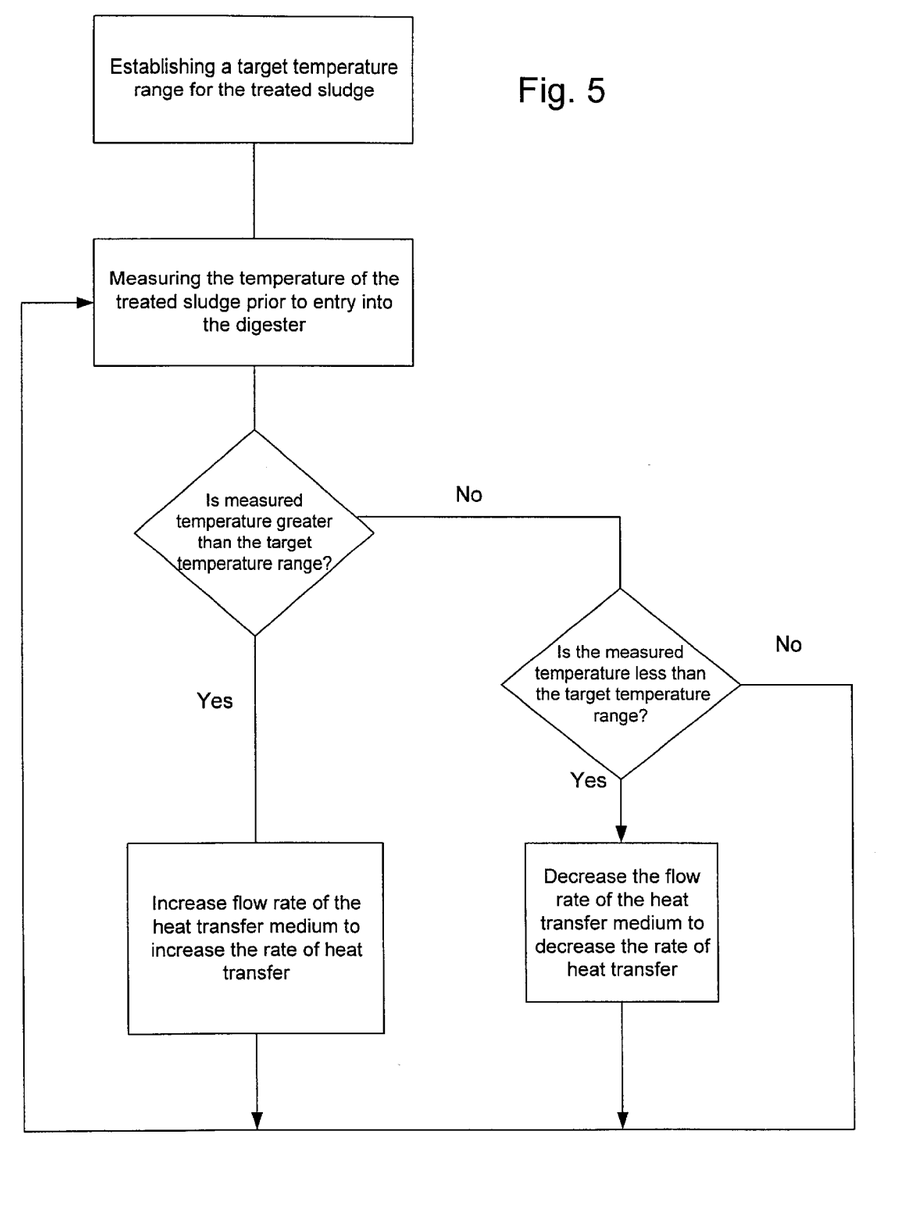
FIG. 5 is a flow chart that illustrates the control steps employed by a controller in controlling the flow of a heat transfer medium through selected heat exchangers employed within the pathogen reduction system.

FIG. 5 is a flow chart showing the basic programming functions for the controller 96 with regard to controlling the cooling and heat transfer effectuated by exchangers 28, 86 and 88. After the target temperature range has been established, the temperature of the sludge is measured by the temperature indicator TI just prior to the sludge entering the digester. If the measured temperature is greater than the target temperature range, then the controller 96 acts to increase the speed of pump 92 so as to increase the flow rate of the heat transfer medium through the closed conduit 90. This will increase the rate of heat transfer from the treated sludge to the incoming sludge and in that process, the temperature of the treated sludge will be reduced further. Thus, the flow rate of the heat transfer medium is continued to be increased until the target temperature range of 34–38° C. is reached. In practice, there is a limit to the flow rate of the heat transfer medium. The mass flow rate of the heat transfer medium should not exceed the mass flow rate of the sludge.

On the other hand, if the measured temperature of the sludge just prior to reaching the digester is not greater than the target temperature range, then the program determines if the measured temperature is less than the target temperature range. If no, the program simply bypasses the remaining functions and returns to measuring the temperature of the treated sludge just prior to entry into the digester. If the measured temperature is less than the target temperature range, then the controller 96 functions to decrease the speed of the variable speed pump 92 so as to decrease the flow rate of the heat transfer medium through the closed conduit 90. This function is effectively repeated until the temperature of the sludge entering the digester 104 meets the target temperature range.

The above discussion deals with controlling one group of heat exchangers within the total pathogen reduction system. However, it is appreciated, that the same programmable controller 96 may be used to control all of the heat exchangers within the pathogen reduction system by controlling the various heat transfer mediums and fluids that are used to transfer heat. In short, the programmable controller can be programmed to assure that the boiler 36 in combination with the heat transfer to the incoming sludge from the treated sludge is sufficient to assure that the sludge entering the reactors is at a selected temperature and at the same time assure that the temperature of the sludge reaching the digester 104 is within the target of temperature range.

The present invention may, of course, be carried out in other specific ways than those herein set forth without departing from the spirit and the essential characteristics of the invention The present embodiments are therefore to be construed in all aspects as illustrative and not restrictive and all changes coming within the meaning and equivalency range of the appended claims are intended to be embraced therein.

What is claimed is:

1. A method of treating sludge to reduce pathogens within the sludge, comprising:
    a. directing incoming sludge through a first heat exchanger;
    b. directing the incoming sludge from the first heat exchanger to one or more reactors for holding and treating the sludge;
    c. directing the treated sludge from the one or more reactors through a second heat exchanger;
    d. directing a heat transfer medium through the first and second heat exchangers for efficiently heating the incoming sludge and cooling the treated sludge;
    e. directing the treated sludge from the second heat exchanger and ultimately to a digester; and
    f. varying the flow of the heat transfer medium through the first and second heat exchangers so as to cool the treated sludge to a target temperature range before reaching the digester.

2. The method of claim 1 wherein varying the flow of the heat transfer medium through the first and second heat exchangers so as to cool the treated sludge to the target temperature range comprises the step of varying the flow of the heat transfer medium through the first and second heat exchangers such that the temperature of the treated sludge reaching the digester approximates the target temperature range of approximately 34–38° C.

3. The method of claim 1 further comprising the step of directing the treated sludge through a third heat exchanger for further cooling after directing the treated sludge through the second heat exchanger.

4. The method of claim 3 further comprising the step of using water as the heat transfer medium for the third heat exchanger.

5. The method of claim 1 further comprising the step of measuring the temperature of the treated sludge after passage through said second heat exchanger and prior to reaching the digester to determine if the temperature approaches the target temperature range.

6. The method of claim 5 further comprising the step of increasing the flow rate of the heat transfer medium to increase the cooling of the treated sludge.

7. The method of claim 5 further comprising the step of decreasing the flow rate of the heat transfer medium to decrease the cooling of the treated sludge.

8. The method of claim 1 further comprising the step of interposing a heating heat exchanger between the first heat exchanger and the one or more reactors, wherein the heating heat exchanger transfers heat from an external source to the incoming sludge.

9. The method of claim 1 including continuing to monitor the temperature of the treated sludge before it enters the digester and controlling the flow rate of the heat transfer medium in accordance with the temperature of the treated sludge before it reaches the digester such that the flow rate of the heat transfer medium is selectively increased to cool the treated sludge and selectively decreased in order to retain more heat within the treated sludge.

10. The method of claim 9 wherein the heat transfer medium is pumped through the first and second heat exchangers by variable speed pump and wherein the variable speed pump is controlled by a CPU.

11. The method of claim 1 wherein the first and second heat exchangers include an inner conduit through which the incoming and treated sludge move and an outer conduit, that at least partially surrounds the inner conduit, through which the heat transfer medium passes.

12. A predigestion pathogen reduction system for removing pathogens from sludge, comprising:
   a. a first heat exchanger for receiving incoming sludge and heating the same;
   b. one or more reactors in fluid communication with the first heat exchanger for receiving sludge therefrom, the one or more reactors adapted to hold and treat the heated sludge;
   c. a second heat exchanger disposed in fluid communication with the one or more reactors for receiving treated sludge therefrom and cooling the treated sludge as it passes through the second heat exchanger;
   d. a digester located down stream from the second heat exchanger for receiving treated sludge after the same has been cooled by the second heat exchanger;
   e. a heat transfer medium contained within a closed loop that extends in a heat exchange relationship with both the first and second heat exchangers and wherein the heat transfer medium functions to remove heat from the treated sludge and add heat to the incoming sludge; and
   f. a variable speed pump connected within the closed loop for pumping the heat transfer medium through the first and second heat exchangers and for varying the flow rate of the heat transfer medium in the closed loop so as to cool the treated sludge to a target temperature range prior to the treated sludge reaching the digester.

13. The system of claim 12 wherein the second heat exchanger that functions to cool the treated sludge includes first and second heat exchanger sections connected in series.

14. The system of claim 12 including a controller for sensing the temperature of the treated sludge prior to introduction into the digester and controlling the speed of a variable speed pump such that the temperature of the treated sludge approaches the target temperature range prior to introduction into the digester.

15. The system of claim 12 further comprising a third heat exchanger for cooling the treated sludge, said third heat exchanger fluidly connected to said digester and positioned serially between said second heat exchanger and said digester wherein said third heat exchanger contains an external heat transfer medium.

16. The system of claim 12 further comprising a heating heat exchanger positioned between said first heat exchanger and the one or more reactors, wherein said heating heat exchanger heats the incoming sludge to a desired temperature range prior to introducing the incoming sludge to the one or more reactors.

17. A method of transferring heat in a pathogen reduction system for sludge, comprising:
   a. directing incoming, pathogen bearing sludge through a first heat exchanger and heating the incoming sludge;
   b. introducing the heated incoming sludge to one or more reactors to reduce the pathogens therein to create treated sludge;
   c. directing the treated sludge from the one or more reactors to a second heat exchanger and cooling the treated sludge;
   d. transferring the treated sludge to a digester; and
   e. transferring heat from the treated sludge to the incoming sludge by directing a closed loop through the first and second heat exchangers and channeling a heat exchange medium through the closed loop in a direction counter to the flow of both the incoming sludge and the treated sludge and relying solely on the heat transfer characteristics of the heat transfer medium to transfer heat from the treated sludge to the incoming sludge.

18. The method of claim 17 further including varying the flow rate of the heat transfer medium so as to control the temperature of the treated sludge prior to entry into the digester.

19. The method of claim 18 wherein there is a target temperature range for the treated sludge entering the digester and wherein the flow rate of the heat transfer medium is varied such that the target temperature range is met.

20. The method of claim 17 further comprising the step of directing the treated sludge through a third heat exchanger for further cooling after directing the treated sludge through the second heat exchanger.

21. The method of claim 20 further comprising the step of using water as the heat transfer medium for the third heat exchanger.

22. The method of claim 17 including a variable speed pump for pumping the heat transfer medium between the first and second heat exchangers and a controller operatively connected to the variable speed pump for varying the speed of the pump and consequently varying the flow rate of the heat transfer medium.

23. The method of claim 22 including sensing the temperature of the treated sludge before introduction into the digester and wherein the control exercised by the controller over the variable speed pump is a function of the temperature of the treated sludge measured prior to introduction into the digester.

* * * * *